(12) United States Patent
Baccouche et al.

(10) Patent No.: US 10,988,014 B2
(45) Date of Patent: Apr. 27, 2021

(54) FRAME SUPPORT ASSEMBLY

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Greg Gombert, Canton, MI (US); Marcela Arana, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 16/521,910

(22) Filed: Jul. 25, 2019

(65) Prior Publication Data
US 2021/0024131 A1 Jan. 28, 2021

(51) Int. Cl.
*B60K 1/04* (2019.01)
*B62D 21/02* (2006.01)

(52) U.S. Cl.
CPC ............... *B60K 1/04* (2013.01); *B62D 21/02* (2013.01); *B60K 2001/0438* (2013.01); *B60Y 2306/01* (2013.01)

(58) Field of Classification Search
CPC .......... B60K 1/04; B62D 21/02; B62D 21/05; B62D 21/06
USPC .................................. 296/203.01, 204, 205
See application file for complete search history.

(56) References Cited

U.S. PATENT DOCUMENTS

| | | | |
|---|---|---|---|
| 2,121,007 A | 6/1938 | Best | |
| 7,568,755 B2 | 8/2009 | Imada et al. | |
| 7,905,541 B2 | 3/2011 | Yamaguchi et al. | |
| 9,102,362 B2 | 8/2015 | Baccouche et al. | |
| 9,643,660 B2* | 5/2017 | Vollmer | B60L 50/60 |
| 9,884,648 B1* | 2/2018 | Grattan | B62D 21/152 |
| 9,937,781 B1 | 4/2018 | Bryer et al. | |
| 9,956,992 B1* | 5/2018 | Iimi | B62D 21/11 |
| 10,005,349 B2 | 6/2018 | Baccouche et al. | |
| 2013/0118823 A1* | 5/2013 | Pohl | B62D 25/087 180/68.5 |
| 2014/0338999 A1* | 11/2014 | Fujii | B60L 50/66 180/68.5 |
| 2018/0022388 A1* | 1/2018 | Nishikawa | B62D 21/02 296/187.09 |
| 2018/0265135 A1 | 9/2018 | Komiya et al. | |
| 2019/0152530 A1* | 5/2019 | Kato | B62D 25/2072 |
| 2019/0351750 A1* | 11/2019 | Caliskan | B62D 21/02 |

* cited by examiner

*Primary Examiner* — Jason S Daniels
(74) *Attorney, Agent, or Firm* — Raymond L. Coppiellie; Bejin Bieneman PLC

(57) ABSTRACT

An assembly includes a first frame rail and a second frame rail elongated along a longitudinal axis and spaced from each other along a lateral axis. The assembly includes a crossbeam extending along the lateral axis and fixed under the first frame rail and the second frame rail. The assembly includes a first support member extending transversely from the crossbeam to a first end fixed to the first frame rail. The assembly includes a second support member extending transversely from the crossbeam to a second end fixed to the second frame rail.

19 Claims, 4 Drawing Sheets

FRAME SUPPORT ASSEMBLY

BACKGROUND

A vehicle may include a propulsion system having an electric motor. The propulsion system may include a battery supported by a frame of the vehicle, e.g., underneath a passenger cabin. The frame provides rigidity to the vehicle and support other components.

DETAILED DESCRIPTION

Figure 1:
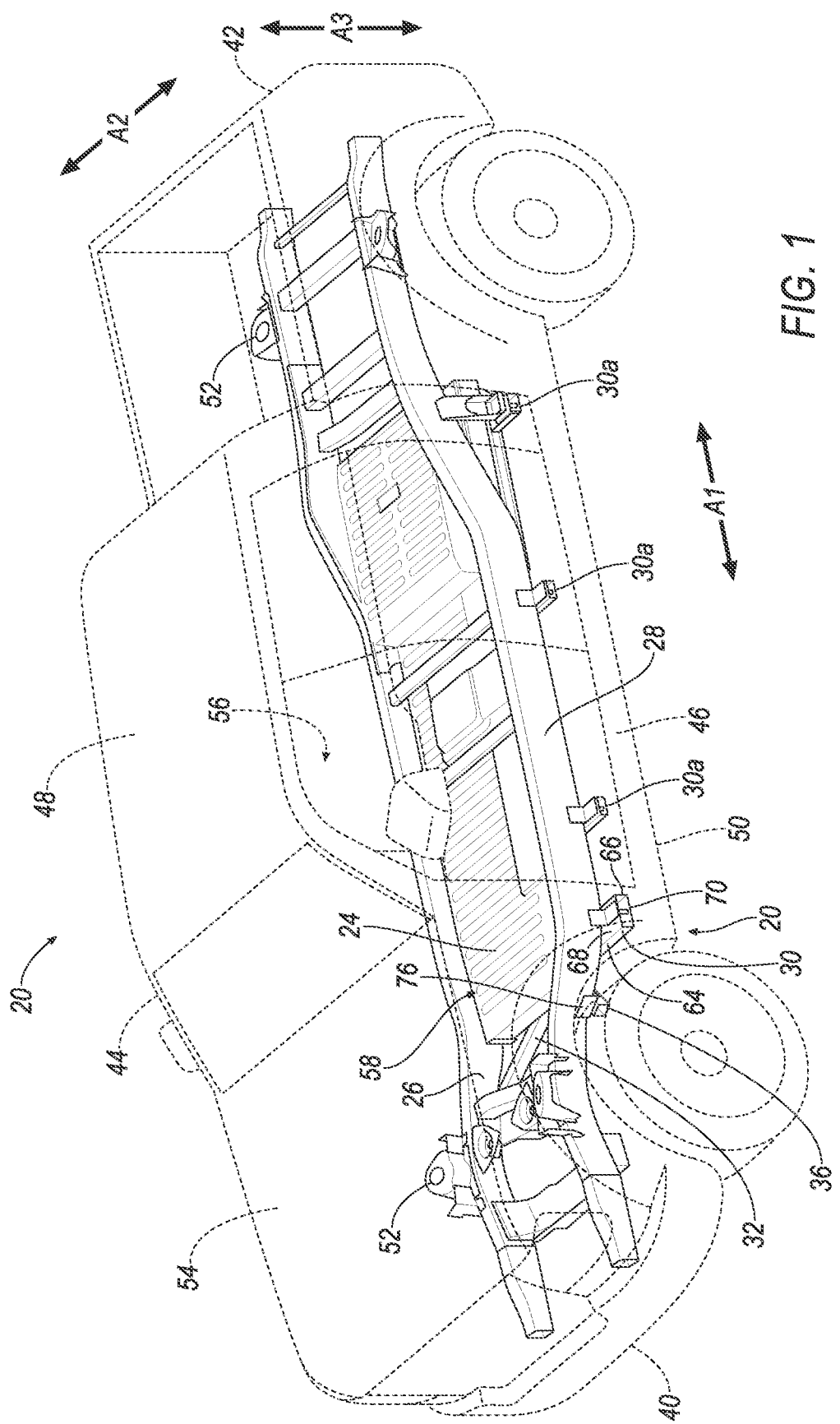
FIG. 1 is a top-side perspective view of a vehicle.
Figure 2:
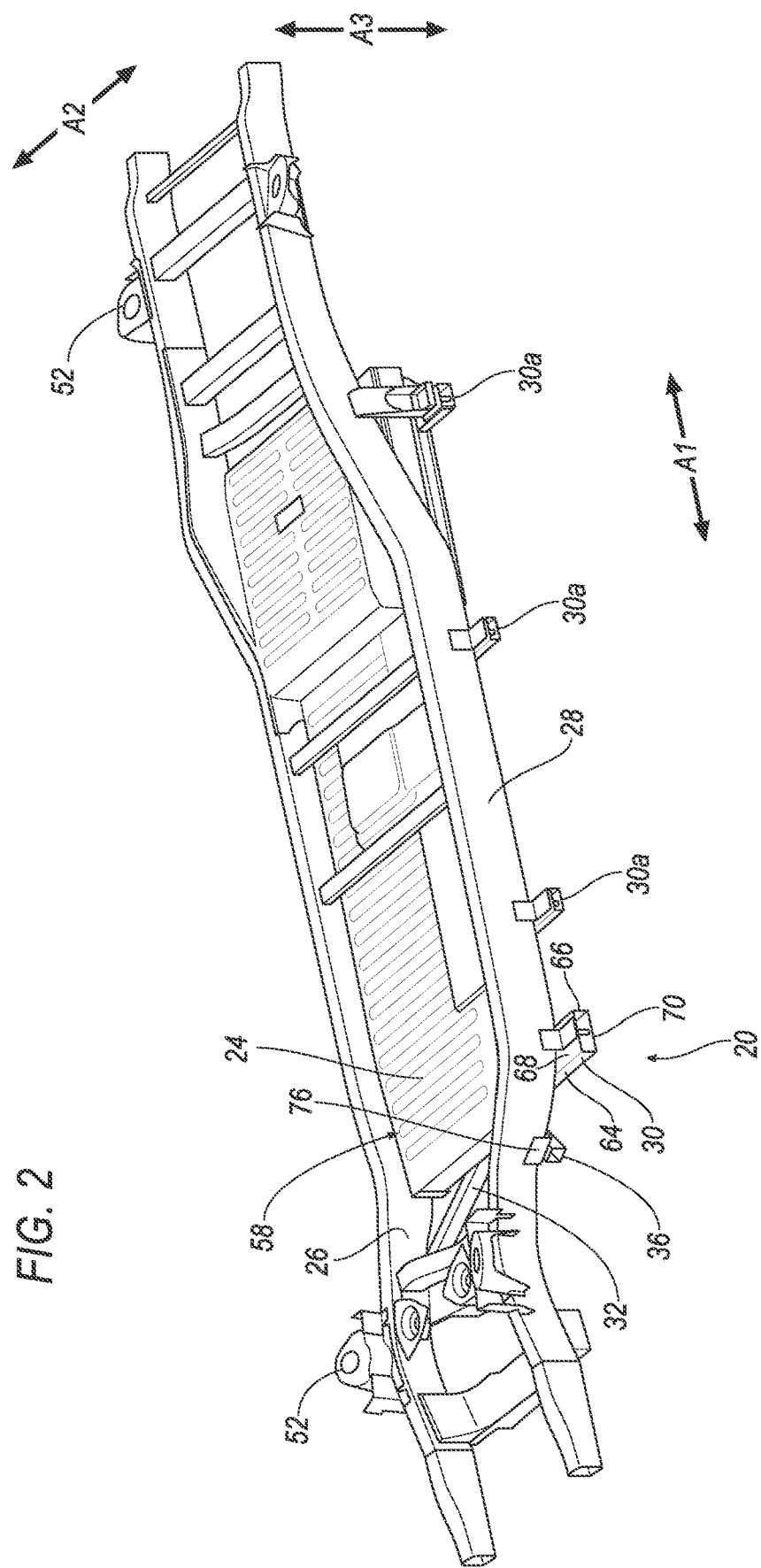
FIG. 2 is a top-side perspective view of components of the vehicle.

An assembly includes a first frame rail and a second frame rail elongated along a longitudinal axis and spaced from each other along a lateral axis. The assembly includes a crossbeam extending along the lateral axis and fixed under the first frame rail and the second frame rail. The assembly includes a first support member extending transversely from the crossbeam to a first end fixed to the first frame rail. The assembly includes a second support member extending transversely from the crossbeam to a second end fixed to the second frame rail.

The assembly may include a battery above the crossbeam.
The battery may be between the first frame rail and the second frame rail.
The first end of the first support member may be forward of the battery.
The assembly may include a bracket fixing the first end of the first support member to the first frame rail.
The bracket may define a channel, and the first end of the first support member may be in the channel.
The assembly may include a second crossbeam extending along the lateral axis and fixed under the first frame rail and the second frame rail, and a third support member extending from the crossbeam to the second crossbeam.
The crossbeam may be between the first support member and the second crossbeam.
The assembly may include a fourth support member extending from the crossbeam to the second crossbeam, the third support member proximate the first frame rail and the fourth support member proximate the second frame rail.
The third support member may define a notch, and the second crossbeam may be in the notch.
The first support member and the second support member may extend from a lateral center of the crossbeam.
The first support member may include an internal panel extending from the crossbeam toward the first end.
The assembly may include a battery compartment supported by the first frame rail and the second frame rail.
The crossbeam, the first support member, and the second support member may be K-shaped.
The first support member may abut the second support member.

A vehicle includes a first frame rail and a second frame rail extending between a vehicle front and a vehicle rear and spaced from each other. The vehicle includes a crossbeam extending along a lateral axis and fixed under the first frame rail and the second frame rail. The vehicle includes a first support member extending from the crossbeam toward the vehicle front to a first end fixed to the first frame rail. The vehicle includes a second support member extending from the crossbeam toward the vehicle front to a second end fixed to the second frame rail.

The vehicle may include a passenger cabin above the first frame rail and the second frame rail.
The vehicle may include a body mount fixed to the first frame rail.
The vehicle may include a body supported by the body mount.

With reference to the Figures, wherein like numerals indicate like parts throughout the several views, a vehicle 20 may include an assembly 22 for increasing rigidity and reducing deformation of the vehicle 20 proximate a battery 24. The assembly 22 includes a first frame rail 26 and a second frame rail 28 elongated along a longitudinal axis A1 and spaced from each other along a lateral axis A2. The assembly 22 includes a crossbeam 30 extending along the lateral axis A2 and fixed under the first frame rail 26 and the second frame rail 28. The assembly 22 includes a first support member 32 extending transversely from the crossbeam 30 to a first end 34 fixed to the first frame rail 26. The assembly 22 includes a second support member 36 extending transversely from the crossbeam 30 to a second end 38 fixed to the second frame rail 28.

The assembly 22 may decrease deformation of the vehicle 20, e.g., deformation of the first frame rail 26 and second frame rail 28, by transmitting force applied to a front 40 of the vehicle 20 throughout other vehicle components. For example, during a frontal impact to the vehicle 20 force may be applied to the first frame rail 26 and second frame rail 28 and generate compression stress within the frame rails 26, 28. Such force may be transmitted from the frame rails 26, 28 to the first support member 32 and the second support member 36 and then to the crossbeam 30. The transmission of force may reduce compression stress in the frame rails 26, 28 rearward of the ends 34, 38 of the support members 32, 36. The reduced compression stress of the frame rails 26, 28 rearward of the ends 34, 38 relative to forward of the ends 34, 38 may reduce deformation of the frame rails 26, 28 at the battery 24.

The vehicle 20 may be any type of passenger or commercial automobile such as a car, a truck, a sport utility vehicle, a crossover vehicle, a van, a minivan, a taxi, a bus, etc.

The vehicle 20 defines the longitudinal axis A1, e.g., extending between the front 40 and a rear 42 of the vehicle 20. The vehicle 20 defines the lateral axis A2, e.g., extending between a right side 44 and a left side 46 of the vehicle 20. The vehicle 20 defines a vertical axis A3, e.g., extending between a top 48 and a bottom 50 of the vehicle 20. The longitudinal axis A1, the lateral axis A2, and the vertical axis A3 are perpendicular to each other.

The frame rails 26, 28 support systems and assemblies of the vehicle 20, e.g., a suspension system, a brake system, a powertrain system, etc. The frame rails 26, 28 are elongated along the longitudinal axis A1. The frame rails 26, 28 extend between the front 40 and the rear 42 of the vehicle 20. The frame rails 26, 28 are spaced from each other along the lateral axis A2. For example, the first frame rail 26 may be proximate the right side 44 of the vehicle 20, i.e., closer to the right side 44 than the left side 46, and the second frame rail 28 may be proximate the left side 46 of the vehicle 20. The frame rails 26, 28 may be aluminum, steel, or any suitable material.

One or more body mounts 52 may be fixed to the frame rails 26, 28. The body mounts 52 secure a body 54 of the vehicle 20 relative to the frame rails 26, 28. The body mounts 52 may extend transversely from the frame rails 26, 28. The body mounts 52 may be aluminum, steel, or any suitable material. The body mounts 52 may be fixed to the frame rails 26, 28, e.g., via fastener, weld, etc. The body mounts 52 and the frame rails 26, 28 may be unitary, i.e., a one-piece construction.

The body 54 provides an aesthetic look to the vehicle 20 and partially or fully encloses compartments of the vehicle 20, e.g., a passenger cabin 56, a bed, a trunk, etc. The body 54 may include panels of material such as aluminum, steel, plastic, carbon fiber, or any suitable material. The body 54 can be supported by the frame rails 26, 28, e.g., by the body mounts 52. The body 54 may be fixed relative to the body mounts 52, e.g., via fasteners, dampeners, welds, etc.

The passenger cabin 56 is designed to house occupants, if any, of the vehicle 20. The passenger cabin 56 includes one or more seats. The passenger cabin 56 may include controls for operating the vehicle 20, an infotainment system, etc. The passenger cabin 56 is above the frame rails 26, 28, i.e., relative to the vertical axis A3. In other words, the frame rails 26, 28 may be between the passenger cabin 56 and ground supporting the vehicle 20 when the vehicle 20 is right-side-up, i.e., supported by tires of the vehicle 20.

The vehicle 20 has a body-on-frame construction (also referred to as a cab-on-frame construction). In other words, the body 54 and frame rails 26, 28 are separate components, i.e., are modular, and the body 54 is supported on and affixed to the frame rails 26, 28.

The battery 24 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs).

The battery 24 may be supported, e.g., within a battery compartment 58, above the crossbeam 30, e.g., relative to the vertical axis A3. For example, the battery 24 may be between the passenger cabin 56 and the crossbeam 30 along the vertical axis A3. The battery 24 may be between the first frame rail 26 and the second frame rail 28, e.g., along the lateral axis A2.

The battery compartment 58 houses the battery 24. The battery compartment 58 may be any suitable material, e.g., a rigid polymer, a metal, a composite, or a combination of rigid materials. The battery compartment 58 may include panels, walls, supports, etc. For example, the battery compartment 58 may include a bottom panel 60 (illustrated in FIG. 3) that extends between the frame rails 26, 28. The battery compartment 58 may be supported by the frame rails 26, 28. For example, the bottom panel 60 of the battery compartment 58 may be fixed to the frame rails 26, 28, e.g., via fastener, weld, bracket 76, etc.

Figure 3:
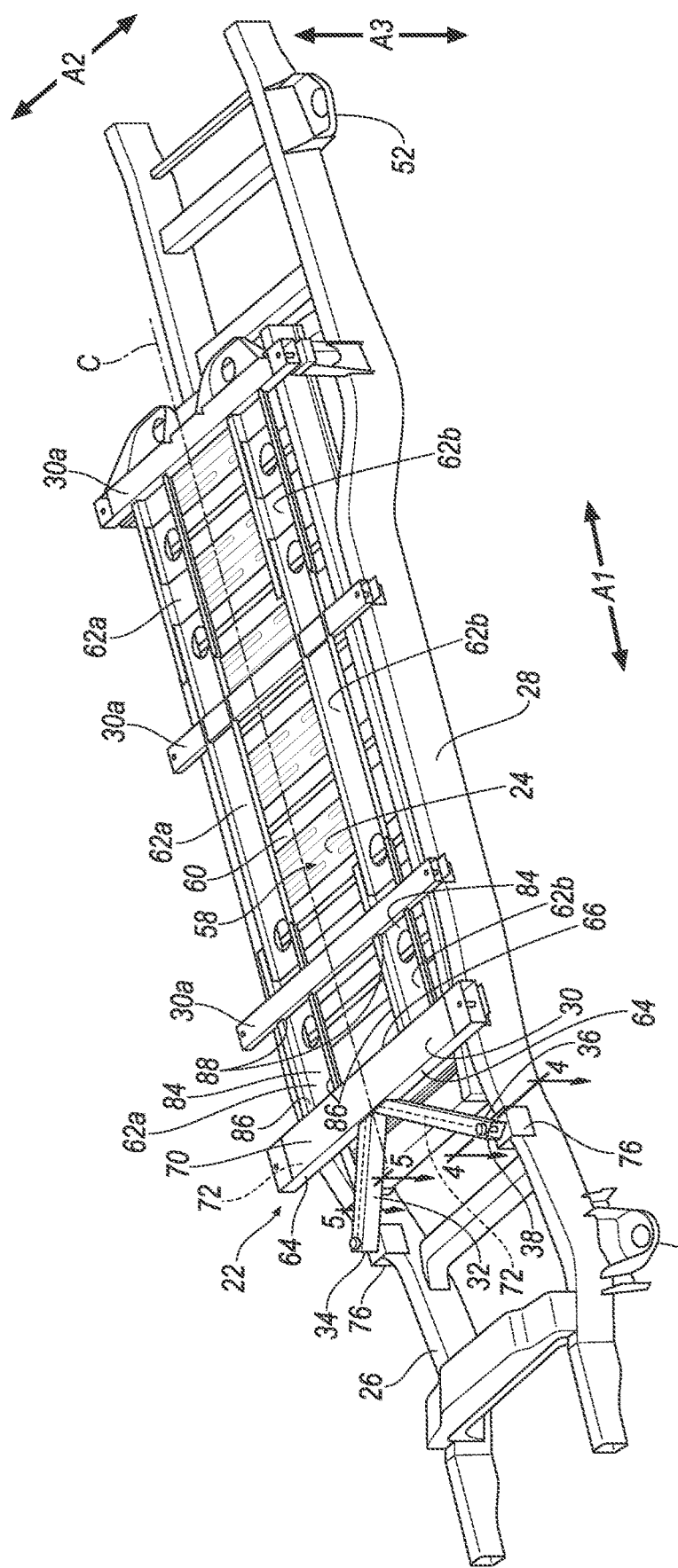
FIG. 3 is a bottom-side perspective view of components of the vehicle.

The crossbeam 30 provides a conduit for transmission of force, e.g., from the first support member 32 and the second support member 36 to the frame rails 26, 28, additional crossbeams 30a, and additional support members 62a, 62b (illustrated in FIG. 3). The crossbeams 30, 30a provide rigidity to the vehicle 20 along the lateral axis A2 and proximate the battery compartment 58. The crossbeams 30, 30a may each be an elongated tube with a rectangular cross-section, or any suitable shape. The crossbeams 30, 30a may each have a front face 64, a rear face 66, a top face 68, and a bottom face 70. The crossbeams 30, 30a may be steel, aluminum, or any suitable material.

The crossbeams 30, 30a extend along the lateral axis A2, e.g., from outboard of the first frame rail 26 on the right side 44 of the vehicle 20 to outboard of the second frame rail 28 on the left side 46 of the vehicle 20. The crossbeams 30, 30a are fixed under the frame rails 26, 28. For example, the frame rails 26, 28 may be between the passenger cabin 56 and the crossbeams 30, 30a, e.g., along the vertical axis A3. As another example, the top face 68 of the crossbeams 30, 30a may abut the frame rails 26, 28. The crossbeams 30, 30a may be fixed to the frame rails 26, 28, e.g., via fastener, weld, bracket 76, etc.

The crossbeams 30, 30a are spaced from each other along the longitudinal axis A1, e.g., with the crossbeam 30 closest to the front 40 of the vehicle 20 and the additional crossbeams 30a spaced along the frame rails 26, 28 toward the rear 42 of the vehicle 20. For example, the crossbeams 30, 30a and the frame rails 26, 28 may form a ladder structure.

The first support member 32 and the second support member 36 provide a conduit for transmission of force, e.g., from the frame rails 26, 28 to the crossbeam 30. The first support member 32 and the second support member 36 provide rigidity to the vehicle 20, e.g., proximate the battery compartment 58. The first support member 32 and the second support member 36 may each be an elongated tube with a rectangular cross-section, or any suitable shape. The first support member 32 and the second support member 36 may be steel, aluminum, or any suitable material.

Figure 5:
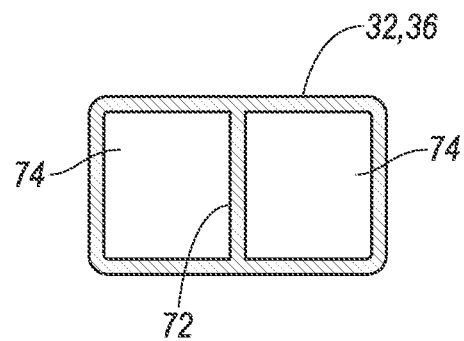
FIG. 5 is a cross section of a portion of the vehicle.

The first support member 32 and the second support member 36 may each include an internal panel 72 extending from the crossbeam 30 toward the first end 34 and the second end 38, respectively. The internal panels 72 may split an interior of the first support member 32 and the second support member 36 into a pair of passages 74 (illustrated in FIG. 5) elongated along the respective first support member 32 and second support member 36 from the crossbeam 30 to the respective ends 34, 38.

The first support member 32 and the second support member 36 extend transversely from the crossbeam 30 toward the front 40 of the vehicle 20. For example, the first support member 32 and the second support member 36 may extend transversely from the front face 64 of the crossbeam 30. As another example, the crossbeam 30 may be between the additional crossbeams 30a and the first support member 32 and the second support member 36 along the longitudinal axis A1.

The first support member 32 and the second support member 36 may extend from a lateral center C of the crossbeam 30 (illustrated in FIG. 3). The lateral center C may be midway between the frame rails 26, 28 along the lateral axis A2. The first support member 32 may abut the second support member 36, e.g., at the lateral center C. The first support member 32 and the second support member 36 may extend outboard, e.g., toward the right side 44 of the vehicle 20 and the second side of the vehicle 20, respectively. The first support member 32, the second support member 36, and the crossbeam 30 may collectively be K-shaped, e.g., when view from underneath or above the vehicle 20.

The first support member 32 and the second support member 36 may be fixed to the crossbeam 30, e.g., to the front face 64. The first support member 32 and the second support member 36 may be fixed to the crossbeam 30 via fastener, weld, bracket, etc. The first support member 32, the second support member 36, and the crossbeam 30 may be unitary.

The first support member 32 and the second support member 36 extend from the crossbeam 30 to the first end 34 and the second end 38, respectively. The first end 34 of the first support member 32 and the second end 38 of the second support member 36 may be forward of the battery 24 and the battery compartment 58, e.g., relative to longitudinal axis A1. In other words, the first end 34 of the first support member 32 and the second end 38 of the second support member 36 may be between the front 40 of the vehicle 20 and the battery compartment 58.

Figure 4:
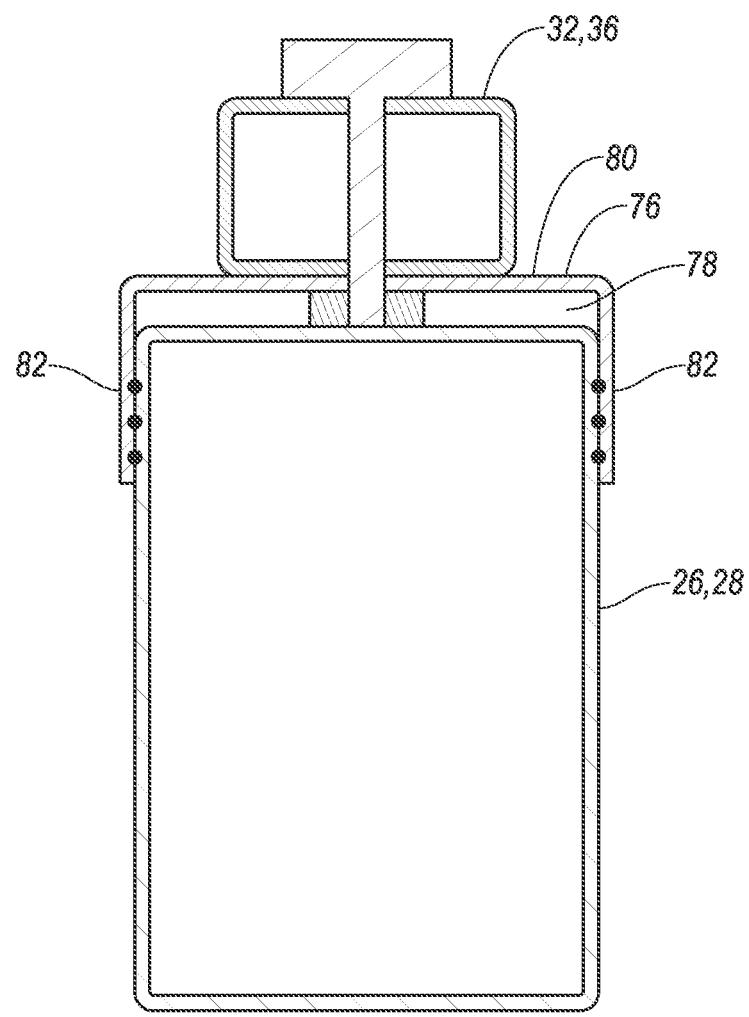
FIG. 4 is a cross section of a portion of the vehicle.

The first end 34 of the first support member 32 is fixed to the first frame rail 26 and the second end 38 of the second support member 36 is fixed to the second frame rail 28. For example, a bracket 76 may fix the first end 34 of the first support member 32 to the first frame rail 26, and another bracket 76 may fix the second end 38 of the second support member 36 to the second frame rail 28. Each of the brackets 76 may define a channel 78 (illustrated in FIG. 4). For example, the brackets 76 may each include a base 80 and a pair of sidewalls 82 extending from the base 80. The channel 78 may be between the sidewalls 82. The first end 34 of the first support member 32 and the second end 38 of the second support member 36 may be in the channel 78 of one of the brackets 76. The sidewalls 82 of the brackets 76 may be fixed to the first end 34 and the second end 38, e.g., via fastener, weld, etc. The bases 80 of the brackets 76 may be fixed to the frame rails 26, 28 e.g., via fastener, weld, etc.

The support members 32, 36 may be under the frame rails 26, 28. For example, the frame rails 26, 28 may be between the passenger cabin 56 and the support members 32, 36 along the vertical axis A3.

The additional support members 62a, 62b provide a conduit for transmission of force, e.g., between the crossbeams 30, 30a. The additional support members 62a, 62b provide rigidity to the vehicle 20 along the longitudinal axis A1 and proximate the battery compartment 58. The additional support members 62a, 62b may each be elongated along the longitudinal axis A1. One of the additional support members 62a may be proximate the first frame rail 26, e.g., closer to the first frame rail 26 to the second frame rail 28, and another of the additional support members 62b may be proximate the second frame rail 28.

The additional support members 62a, 62b may each include a base 84 and a pair of sidewalls 86 extending transversely from the base 84 (illustrated in FIG. 3). The additional support members 62a, 62b may each define one or more notches 88, e.g., in the sidewalls 86. The additional support members 62a, 62b may each include a plurality of portions fixed to each other, e.g., via fastener, weld, etc. The additional support members 62a, 62b may each be unitary. The additional support members 62a, 62b may be any suitable shape. The additional support members 62a, 62b may be steel, aluminum, or any suitable material.

The additional support members 62a, 62b extend from the crossbeam 30 to one or more of the additional crossbeams 30a, e.g., along the longitudinal axis A1. The additional crossbeams 30a may be in one or more of the notches 88 of the additional support members 62a, 62b. The additional support members 62a, 62b may be fixed to one or more of the crossbeams 30, 30a, e.g., via fastener, weld, bracket 76, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a first frame rail and a second frame rail elongated along a longitudinal axis and spaced from each other along a lateral axis;
   a battery supported between the first frame rail and the second frame rail;
   a crossbeam extending along the lateral axis and fixed under the first frame rail and the second frame rail;
   a first support member extending transversely from the crossbeam away from the battery to a first end fixed to the first frame rail; and
   a second support member extending transversely from the crossbeam away from the battery to a second end fixed to the second frame rail.

2. The assembly of claim 1, further comprising a battery above the crossbeam.

3. The assembly of claim 2, wherein the first end of the first support member is forward of the battery.

4. The assembly of claim 1, further comprising a bracket fixing the first end of the first support member to the first frame rail.

5. The assembly of claim 4, wherein the bracket defines a channel, and the first end of the first support member is in the channel.

6. The assembly of claim 1, further comprising a second crossbeam extending along the lateral axis rearward of the crossbeam and fixed under the first frame rail and the second frame rail, and a third support member extending from the crossbeam to the second crossbeam.

7. The assembly of claim 6, wherein the crossbeam is between the first support member and the second crossbeam.

8. The assembly of claim 6, further comprising a fourth support member extending from the crossbeam to the second crossbeam, the third support member proximate the first frame rail and the fourth support member proximate the second frame rail.

9. The assembly of claim 6, wherein the third support member defines a notch, and the second crossbeam is in the notch.

10. The assembly of claim 1, wherein the first support member and the second support member extend from a lateral center of the crossbeam.

11. The assembly of claim 1, wherein the first support member includes an internal panel extending from the crossbeam toward the first end.

12. The assembly of claim 1, further comprising a battery compartment supported by the first frame rail and the second frame rail.

13. The assembly of claim 1, wherein the crossbeam, the first support member, and the second support member are K-shaped.

14. The assembly of claim 1, wherein the first support member abuts the second support member.

15. A vehicle, comprising:
    a first frame rail and a second frame rail extending between a vehicle front and a vehicle rear and spaced from each other;
    a crossbeam extending along a lateral axis and fixed under the first frame rail and the second frame rail;
    a first support member extending directly from the crossbeam toward the vehicle front to a first end fixed to the first frame rail; and
    a second support member extending directly from the crossbeam toward the vehicle front to a second end fixed to the second frame rail.

16. The vehicle of claim 15, further comprising a passenger cabin above the first frame rail and the second frame rail.

17. The vehicle of claim 15, further comprising a body mount fixed to the first frame rail.

18. The vehicle of claim 15, wherein the first support member and the second support member extend from a lateral center of the crossbeam toward the vehicle front.

19. An assembly, comprising:
- a first frame rail and a second frame rail elongated along a longitudinal axis and spaced from each other along a lateral axis;
- a crossbeam that extends along the lateral axis and fixed under the first frame rail and the second frame rail;
- a second crossbeam that extends along the lateral axis and fixed under the first frame rail and the second frame rail;
- a first support member that extends transversely from the crossbeam to a first end fixed to the first frame rail;
- a second support member that extends transversely from the crossbeam to a second end fixed to the second frame rail;
- a third support member that extends from the crossbeam to the second crossbeam, the third support member defines a notch, and the second crossbeam is in the notch.

\* \* \* \* \*